United States Patent [19]

Schreier et al.

[11] Patent Number: 5,404,997
[45] Date of Patent: Apr. 11, 1995

[54] ARTICLE TRANSPORTING APPARATUS INCLUDING INTERCONNECTED CHAIN PART PROVIDED WITH ROLL BODIES

[75] Inventors: Ulrich Schreier, Bremen; Karl-Wilhelm Kuckelsberg, Schwanewede, both of Germany

[73] Assignee: Johann A. Krause Machinenfabrik, Bremen-Farge, Germany

[21] Appl. No.: 986,503

[22] Filed: Dec. 7, 1992

[30] Foreign Application Priority Data

Dec. 5, 1991 [DE] Germany .................. 41 40 206.5

[51] Int. Cl.6 .............................................. B65G 17/00
[52] U.S. Cl. ................................... 198/779; 198/838; 198/845; 198/852
[58] Field of Search ............... 198/845, 779, 838, 850, 198/851, 852, 853

[56] References Cited

U.S. PATENT DOCUMENTS

| 3,285,395 | 11/1966 | Resener | 198/851 |
|---|---|---|---|
| 4,438,842 | 3/1984 | Allredge et al. | 198/838 |
| 4,645,070 | 2/1987 | Homeier | 198/845 X |

FOREIGN PATENT DOCUMENTS

| 203898 | 12/1986 | European Pat. Off. . |
| 409379 | 1/1991 | European Pat. Off. . |
| 2425998 | 12/1979 | France . |
| 2517647 | 6/1983 | France . |
| 2573053 | 11/1984 | France . |
| 242276 | 10/1987 | France . |
| 2636052 | 9/1988 | France . |
| 919036 | 10/1954 | Germany . |
| 948049 | 2/1956 | Germany . |
| 2118232 | 4/1971 | Germany . |
| 2615598 | 10/1976 | Germany . |
| 2735987 | 3/1979 | Germany . |
| 2742095 | 11/1982 | Germany . |
| 8436734 | 9/1985 | Germany . |
| 3438786 | 4/1986 | Germany . |
| 3541364 | 12/1986 | Germany . |
| 3737895 | 5/1989 | Germany . |
| 3935729 | 5/1990 | Germany . |
| 3842114 | 6/1990 | Germany . |
| 951079 | 3/1964 | United Kingdom . |
| 2010208 | 6/1979 | United Kingdom . |
| WO86/02622 | 5/1986 | WIPO . |

Primary Examiner—Cheryl L. Gastineau
Attorney, Agent, or Firm—Burns, Doane, Swecker & Mathis

[57] ABSTRACT

A transport chain for transporting articles along a guideway includes a plurality of interconnected chain parts. The chain parts are provided with a roll body that allows the transport chain to roll along the guideway. The roll body projects through the underside of the respective chain part to rest upon the guideway. The transport chain can also be provided with accumulating rollers that allow the transport chain to continue moving below the transported articles if the articles should reach a temporary standstill.

3 Claims, 7 Drawing Sheets

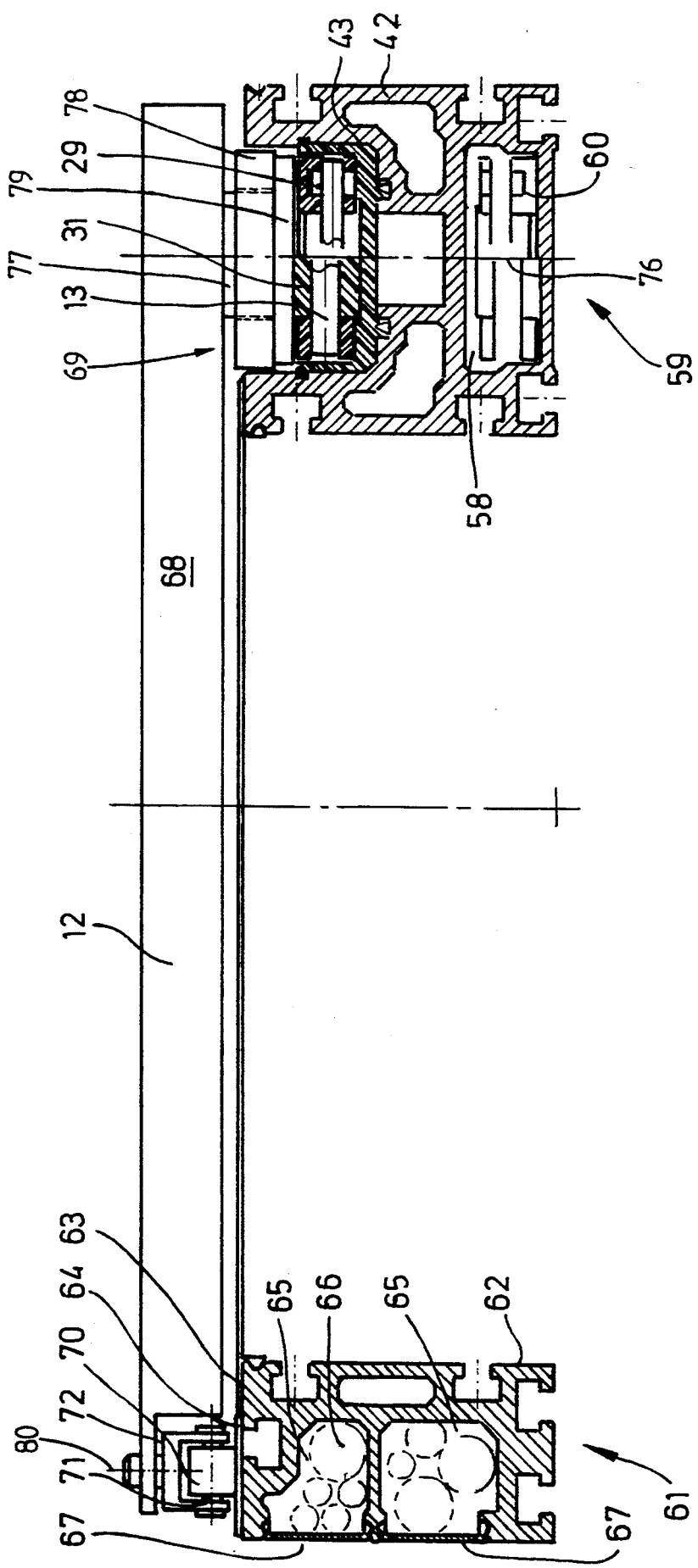

ARTICLE TRANSPORTING APPARATUS INCLUDING INTERCONNECTED CHAIN PART PROVIDED WITH ROLL BODIES

FIELD OF THE INVENTION

The invention relates to an apparatus for transporting articles.

BACKGROUND OF THE INVENTION

These apparatuses are mainly used for transporting light articles, especially workpieces. The articles rest on a conveyor chain either directly or with the aid of transport pallets, which conveyor chain is moved along a guideway. The guideway serves for guiding the conveyor chain on a conveying track defined by the guideway.

In known apparatuses of the aforementioned type, the conveyor chain which is formed from a plurality of coupled chain parts slides along tile stationary (immovable) guideway. This is the reason why such apparatuses are only used for transporting relatively light articles. Nevertheless, even the transport of light articles has drawbacks because the conveyor chain slides along the guideway. These drawbacks are particularly high running noises, relatively strong driving forces and a quite substantial wear and tear.

Known apparatuses of this type are also used in conjunction with accumulation tracks. In this case, some articles come to a standstill on the conveying track while the conveyor chain is still driven. The conveyor chain slides along underneath the articles which are to be transported, which also leads to the aforementioned drawbacks.

Furthermore, the known apparatuses of this type are suitable only for transporting certain articles, especially transport pallets carrying these articles. If, for example, it is intended to use transport pallets which must be retained or guided on the conveyor chain, the guideways have to be provided with guides for the respective transport pallets. In this respect, the known apparatuses suffer a lack of flexibility.

Finally, another drawback of the known apparatuses, especially when they are used in assembly lines, is that the access to the transported articles, on which assembly work has to be carried out, is restricted. The articles can not be accessed from underneath because in known apparatuses of this type the conveyor chain is disposed underneath the articles.

OBJECTS AND SUMMARY OF THE INVENTION

In view of the foregoing, the invention is based on the object of creating an apparatus for transporting articles which meets the desired requirements and in particular ensures a gentle, low-noise and easy transport of the articles in a reliable manner and with little wear and tear.

To attain this object, the apparatus comprises chain parts provided with roll bodies. As a result of the roll bodies which are assigned to the chain parts, the conveyor chain rolls on the conveying path. Thus, the sliding friction between the conveyor chain and the conveying path which normally occurs with known apparatuses of this type is avoided. This result in a reduction of running noises and a substantial inhibition of wear and tear. Moreover, the conveyor chain can be subjected to higher loads.

In a preferred embodiment of the invention, the roll bodies are disposed in the region of the usually articulated connection between two adjacent chain parts. As a result, two different things are accomplished: On the one hand, the conveyor chain is guided precisely along the path of the guideway by the roll bodies, whereas, on the other hand, a reliable and fully rolling guidance of the transport chain is ensured with a lowest possible number of roll bodies.

An apparatus according to the present invention is also provided for attaining the object mentioned at the beginning. As a result of the support rollers which are assigned to the chain parts for supporting the articles which are to be transported, it is accomplished that the conveyor chain can be moved further underneath the (temporarily) immovable articles in accumulating tracks when the articles to be transported come to a temporary standstill. Because it is possible to still drive the accumulating rollers, the articles to be transported may also be moved relative to the conveyor chain. The transport speed of the articles relative to the guideway can be greater or smaller than the speed of the conveyor chain, depending on the direction of the drive of the accumulating rollers.

A support roller is preferably assigned to each chain part. The load of the articles which bear on at least two support rollers is distributed over several chain parts. However, it would also be possible to assign several support rollers to each chain part.

According to a development of the apparatus, each support roller is mounted in the respective chain part to freely rotate about axis of rotation extending transversely to the conveying direction, with at least one upper portion of each support roller projecting upwards relative to the plane of the respective chain part, in order to prevent a contact between the upper plane of the chain part and the article to be transported. As a result of the free rotatability of the support rollers, it is accomplished that, when the articles are stationary, the conveyor chain which is still driven can be moved further easily because the support rollers roll off underneath the (temporarily immovable) article.

Another apparatus for attaining the object of the invention comprises a guideway. Accordingly, the guideway is formed from a support profile having a groove-like depression and a guide rail disposed inside the depression for receiving at least a portion of the conveyor chain. As a result of differently designed guide rails it is possible to move the conveyor chain into different positions relative to the support profile. As a result, the position of the conveyor chain in the guide rail is variable and can thus be adapted to different articles or different pallets for receiving the articles. In this manner, the apparatus can be modified easily by exchanging the guide rails. As a result, the transport chain and, most importantly, the support profile which is usually attached in fixed location to the guideway do not have to be changed.

A further apparatus for attaining the object of the invention comprises two conveying paths. As a result of the two conveying paths, of which only one is assigned, in accordance with the invention, to a transport chain for driving a transport pallet, it is possible to transport articles which have a relatively great volume. The apparatus has a relatively simple structure because the second conveying path does not have a driven conveyor chain. Another advantage of this apparatus is that a space, which permits access to the pallet or the articles which are transported thereon from underneath, is created between the two conveying paths which extend parallel and whose distance is bridged by the transport pallet. As a result, this apparatus is particularly suitable for transporting articles which have to be accessible from all sides, especially from underneath, for example for assembly purposes.

According to a development of this apparatus, the transport pallet is guided on at least one guideway. The transport pallet is preferably guided in the region of that guideway which is provided with the conveyor chain. The underside of the transport pallet may be provided with a projection which engages a corresponding depression or groove of the (first) guideway and which rests on the associated transport chain, such that the transport pallet is taken along by the transport chain in a frictional manner. In a preferred embodiment of the invention, the projection is rotatable about a vertical axis and, if required, is provided with a roller which is rotatable about the same (vertical) axis. Alternatively, it would also be possible to provide the (second) guideway, on which running rollers are disposed on the side of the transport pallet which is located opposite the transport chain, with guide means for the transport pallet. Expediently, these guide means are formed from a rail in which the running rollers slide along.

BRIEF DESCRIPTION OF THE DRAWING FIGURES

Preferred exemplary embodiments of the apparatus according to the invention will be described below in detail with reference to the drawing, in which:

FIG. 1 shows a top plan view of a portion of a conveyor chain,

FIG. 2 shows a side view of a portion of the conveyor chain of a rectilinear conveying track, FIG. 3 shows an enlarged section III—III according to FIG. 1 of a chain part of the conveyor chain, FIG. 4 shows an enlarged section IV—IV according to FIG. 1 of two chain parts of the conveyor chain, FIG. 5 shows a vertical cross section of the apparatus, with a transport pallet and a workpiece disposed thereon, FIG. 6 shows a cross section according to FIG. 4 of the apparatus in the region of an accumulating track, FIG. 7 shows a cross section, similar to FIG. 4, of another embodiment of the apparatus, FIG. 8 shows a cross section, similar to FIG. 6, of a further exemplary embodiment of the apparatus, and FIG. 9 shows a cross section of an embodiment of the apparatus which is again modified.

DETAILED DESCRIPTION OF THE INVENTION

Figure 1:
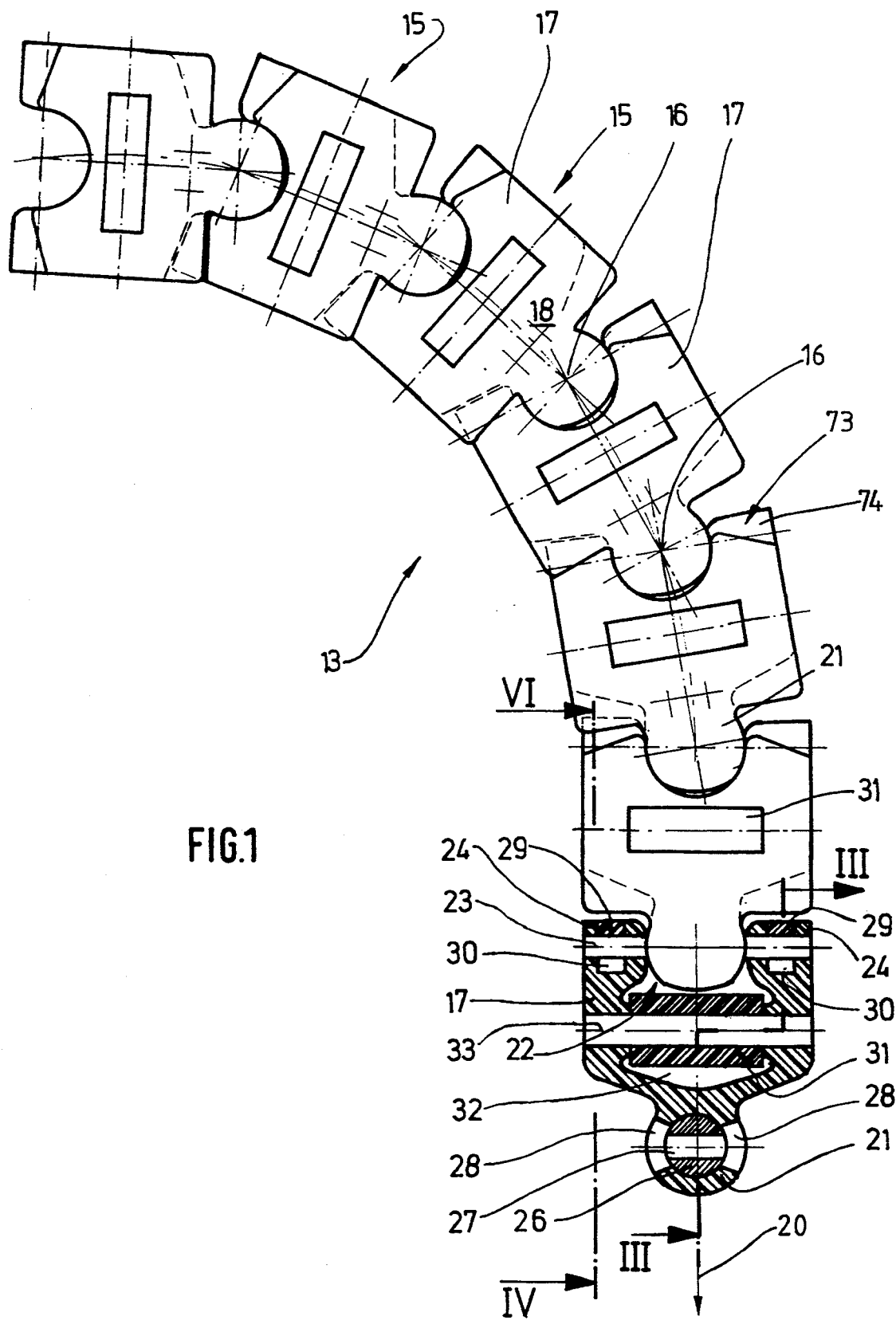

The apparatuses illustrated are so-called link chain conveyors for the transport of relatively light articles. Such conveyors are used, for example, for the transport of workpieces such as V-belt pulley 10 shown in FIG. 4. The workpieces may be transported by the apparatus either directly or with the aid of a transport pallet 11 (FIG. 5) or 12 (FIG. 9) along an assembly line or the like.

The apparatuses of FIGS. 1 to 8 have a preferably endless and rotatingly driven transport chain 13 which runs in a guideway. The guideway is assigned to the assembly line or the like in a stationary, i.e. immovable manner. The conveying track is formed from the path of the guideway which is comprised of rectilinear and curved sections and thereby adapts to the (spatial) conditions. The path of the conveying track is not restricted to one plane; rather, it can extend spatially (three-dimensionally).

The transport chain 13 is comprised of several chain parts 15 (FIGS. 1 to 4). The chain parts 15, which are formed identically per se, are connected to one another. Here, this connection is made in an articulated manner at joints 16 located between adjacent chain parts 15.

Each chain part 15 has a ba se portion 17 which is preferably formed in one piece from plastic material and which has a plane-surfaced top side 18 and underside 19 with respect to the conveying plane. The top side 18 and the bottom side 19 extend parallel to one another. In top plan view, the base portion 17 has an approximately Y-shaped form. It has a coupling projection 21 located at a side which extends transversely relative to the conveying direction 20, and a coupling depression 22 which is formed to correspond to the coupling projection 21 and is located at an opposite side which also extends transversely relative to the conveying direction 20. When the chain parts 15 are coupled together, the coupling projection 21 of one chain part 15 engages the coupling depression 22 of the adjacent chain part 15 (FIG. 1). The connection between the adjacent chain parts 15 is made in the joint 16 by an axle 23 which extends transversely to the conveying direction. This axle extends transversely through the coupling projection 21 of the one chain part 15 and through connecting claws 24 which are located at opposite sides of the coupling depression 22 of the adjacent chain part 15 (FIG. 1). The coupling projections 21 and coupling depressions 22 take the form of corresponding spherical segments which engage one another. As a result, the transport chain 13 can be guided upwards and downwards and in curves (FIG. 1). A pocket hole 25, in which there is located a cylindrical or, if required, a likewise spherical joint member 26, is disposed in the coupling projection 21 and starts from the underside 19 of the base portion 17. The axle 23 extends through a transversely directed bore 27 in the joint member 26. Portions of each coupling projection 21 which adjoin opposite ends of the bore 27 are provided with long holes 28 (FIG. 1). As a result, the axle 23 is rotatable in the coupling projection 21 together with the joint member 26, which permits the curve negotiating characteristic of the transport chain 13.

Figure 4:
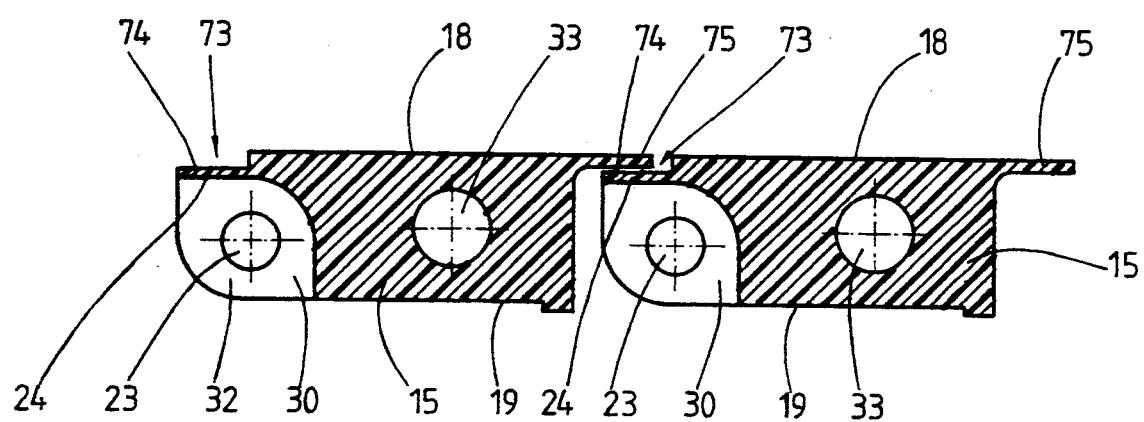

Each chain part 15 has depressions 73 located at the two connecting claws 24 disposed next to one another in spaced relationship. The depressions 73 start from the top sides 18 of the chain parts 15. A plane cover surface 74 of each depression 73 extends be low the top side 18 at a parallel distance. At opposite sides of the coupling projection 21, i.e. at the end of the chain part 15 which is directed away from the depressions 73, thin plate-like projections 75 are disposed. They are formed to correspond to the depressions. The length of the projections 75 is such that the projections 75 of the one chain part 15 extend over a portion of the depressions 73 in the adjacent chain part 15 (FIGS. 1 and 4). As a result, no interspaces are formed between the adjacent chain parts 15 when the transport chain 13 extends rectilinearly. The top sides 18 of adjacent chain parts 15 thus merge into one another seamlessly. An appropriate design of the projections 75 and the outwardly expanding depressions 73 makes it possible that, in the case of a curved path of the transport chain 13, the projections 75 nearly completely fill out the depressions 73 on the inner side of the curve. As a result, a seamless transition to adjacent chain parts 15 is ensured on the inner side of the curve as well (FIG. 1).

Figure 3:
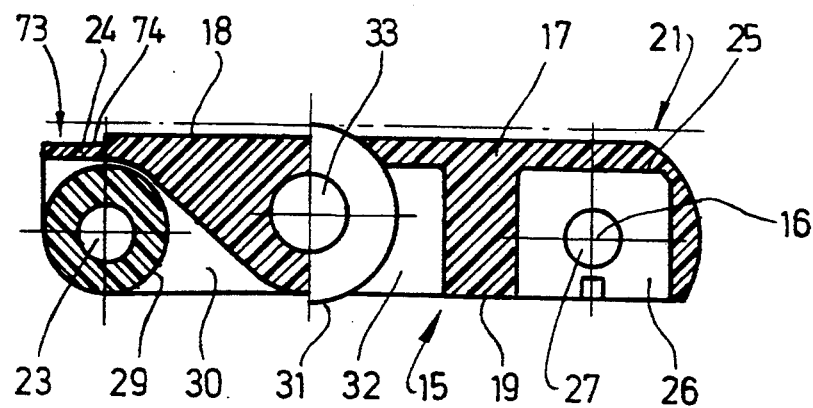
Figure 5:
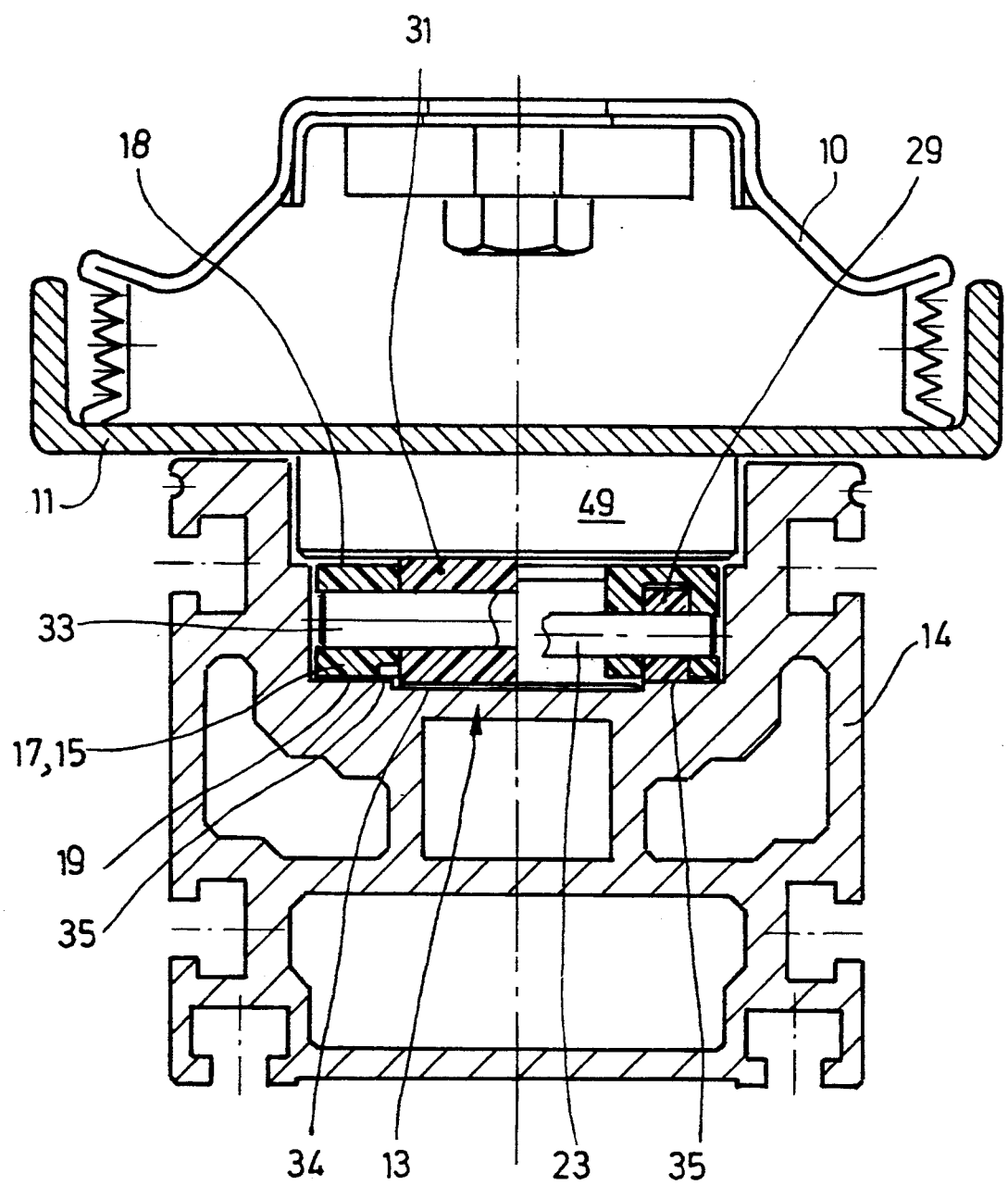

According to the invention, the chain parts 15 are provided with roll bodies. In the exemplary embodiment illustrated, each chain part 15 has two roll bodies. In this case, the roll bodies take the form of cylindrical rollers 29. One roller 29 is in each case disposed next to the coupling depression 22 in each connecting claw 24 with a corresponding clearance 30. The rollers 29 are retained in the base portion 17 by the axle 23 which serves for connecting adjacent chain parts 15. The rollers 29 are mounted slidingly and freely rotatable on the axle 23. The outer diameter of the equally formed rollers 29 is defined such that each roller 29 partly projects from the underside 19 of the base portion 17 (FIG. 3). As a result, the chain parts 15 bear on the guideway 14 with the rollers 29. The transport chain 13 thus rolls along the guideway 14 in order to avoid a sliding friction (FIG. 5).

Figure 2:
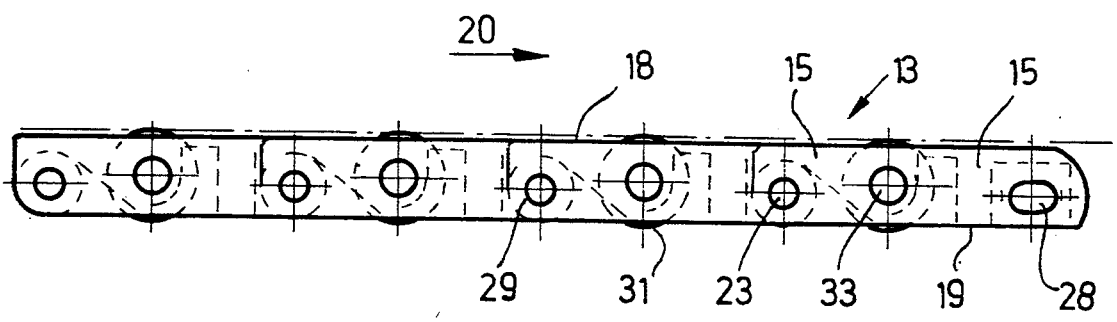

According to the invention, the transport chain 13 is provided with accumulating rollers 31. In the transport chain 13 which is illustrated, each chain part 15 has an accumulating roller 31 (FIGS. 1 to 3). Every accumulating roller 31 is disposed in an appropriate recess 32 located inside the base portion 17. For this purpose, the cylindrical accumulating roller 31 is mounted, especially slidingly mounted, to freely rotate on an axle 33 which extends transversely to the conveying direction 20. As a result, the accumulating roller 31 is rotatable about an axis of rotation which extends transversely to the conveying direction 20. In this case, the outer diameter of the accumulating roller 31 is such that opposite portions of the accumulating roller project from the top side 18 and the underside 19 of the base portion 17 (FIGS. 3 and 5).

Because the accumulating rollers 31 project beyond the top side 18 of the base portion 17, the workpieces or the transport pallet 11 (FIG. 5) which are to be transported on the apparatus bear only on the accumulating roller 31 and not on the base portion 17. As a result, it is accomplished that, in the event of a temporary stand still of the workpiece or the transport pallet 11, the transport chain 13 which is still driven moves along underneath the transport pallet 11 or the workpiece with the accumulating rollers 31 in order to avoid a sliding friction between the transport chain 13 and the transport pallet 11 or the workpieces.

The guideway 14 is designed such that the accumulating roller 31, which also projects beyond the underside 19 of the base portion 17, does not bear on the guideway 14. For this purpose, there is provided a central groove 34 in a running surface 35 for the rollers 29 which is designed to correspond to the width of the accumulating roller 31, such that the portion of the accumulating roller 31 which protrudes from the bottom of the base portion 17 does not contact the guideway 14 (FIG. 5 ). Thus, the accumulating rollers 31 do not move during the transport of the workpieces or the transport pallets 11. As a result, the workpieces or transport pallets 11 are transported along the guideways 14 at the conveying speed of the transport chain 13. Should one or several workpieces or transport pallets 11 come to a standstill or be transported at a reduced speed in comparison with the transport chain 13 in the event of an accumulating track, the accumulating rollers 31 roll off underneath the workpiece or the transport pallet 11 in order to avoid a sliding friction.

Figure 6:
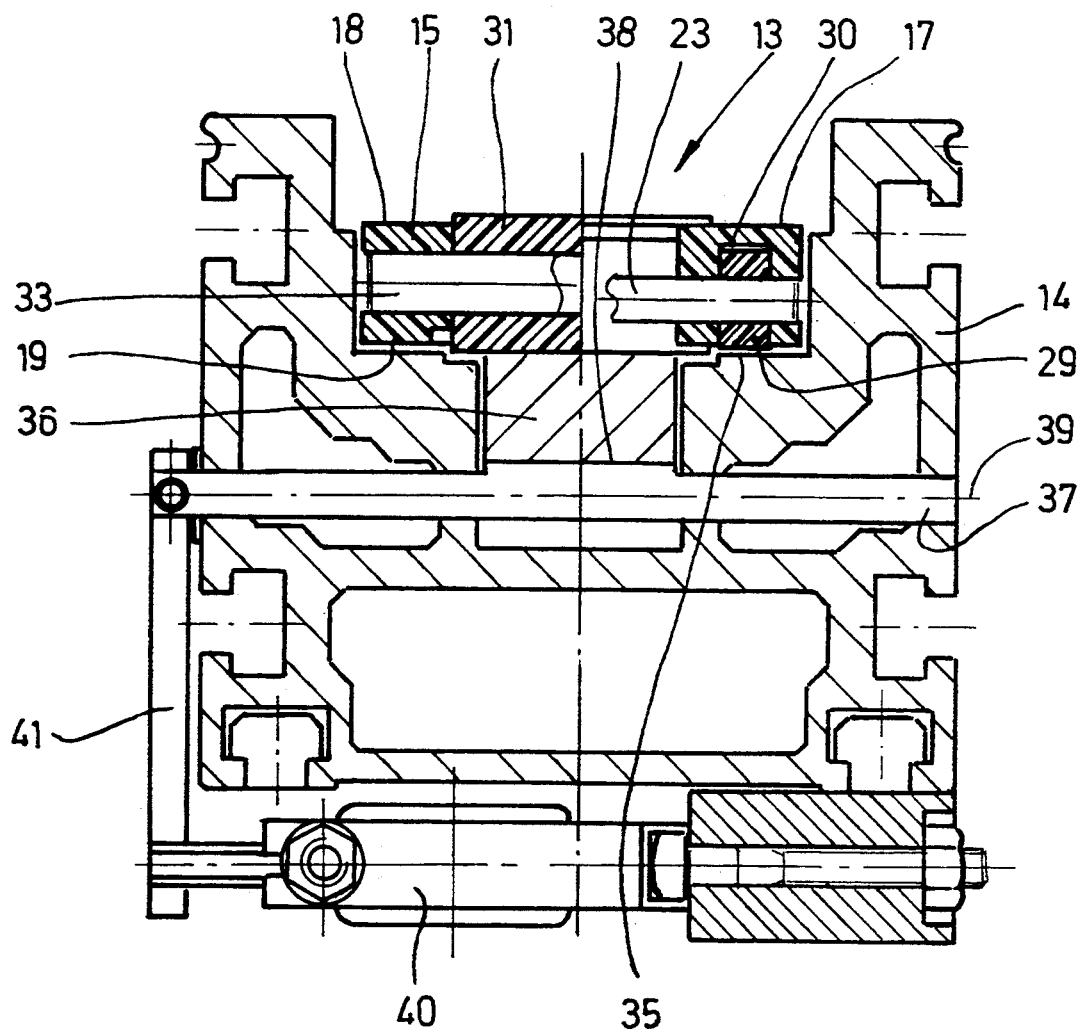

FIG. 6 illustrates a further development of the invention, according to which the accumulating rollers 31 can be driven indirectly. This is accomplished because the accumulating rollers 31 can be put into contact with the guideway 14, preferably at certain sections of the conveying track or guideway 14. The accumulating rollers 31 are thus driven when the conveyor chain 13 is moved along the guideway 14 as a result of a frictional engagement with the guideway by way of rolling on the immovable guideway 14. This can be accomplished by providing the groove 34 in the running surface 35 only at certain sections of the conveying track in the guideway 14.

FIG. 6 illustrates an embodiment of the apparatus which permits a selective drive of the accumulating rollers 31 at certain sections of the conveying track. For this purpose, the guideway is provided with a movable running rail 36 in the region of the groove 3 4. This running rail is mounted on a rotatable shaft 37 with a cam 38. As a result of a rotation of the shaft 37 about its axis of rotation 39 which extends horizontally and transversely to the conveying direction 20, the cam 38 moves the running rail 36 either up or down. In the illustrated exemplary embodiment, the shaft 37 is rotated by a magnet 40 which actuates a pivoting lever 41 which is attached to the axis of rotation 39. However, other drives such as gear-wheel mechanisms, servomotors or pivoting cylinders may be used instead.

When the running rail 36 is moved upwards by the cam 38 to the position illustrated in FIG. 6, the portion of the respective accumulating roller 31 which protrudes from the bottom of the base portion 17 of the chain part 15 contacts the running rail 36 which is disposed on the guideway 14 in a stationary manner with respect to the conveying direction 20. As a result of the movement of the transport chain 13, the accumulating roller 31 is driven frictionally. This drive is directed in the conveying direction 20, so that the transport speed of the workpiece or the transport pallet 11 on the accumulating rollers 31 is twice the speed of the transport chain 13. Accordingly, the workpieces or transport pallets 11 are moved along at twice the conveying speed in the region where the accumulating rollers 31 contact the running rail 36.

The cam 38 is dimensioned such that it lifts the running rail 36 to such an extent that the rollers 29 of the chain part 15 are lifted off the running surface 35 of the guideway 14. As a result, the transport chain 13 with the workpieces or the transport pallets 11 rests only on the running rail 36 (FIG. 6), which ensures a sufficiently strong frictional force between the running rail 36 and the respective accumulating roller 31 in order to create a sufficient driving force of the accumulating roller.

When the cam 38 is moved differently, the running rail 36 is lowered, such that the contact between the running rail 36 and the respective accumulating roller 31 is broken. Now, the chain parts 15 again bear with the rollers 29 on the running surface 35 of the guideway 14, so that the contact of the accumulating roller 31 is interrupted altogether and the latter is no longer driven. The workpieces are then again driven at the speed of the transport chain 13 in the region of the running rail 36.

Alternatively, i t would be possible to dimension the accumulating rollers 31 and arrange them in the base portions 17 in such a way that they project with an upper portion only from the top side 18 of the respective base portion 17. In this embodiment of the apparatus, the transport chain 13 can still roll along underneath the stationary or slowed down workpieces or transport pallets 11, but the accumulating rollers 31 can no longer be driven. This design of the accumulating rollers 31 is particularly suitable for apparatuses in which it is not required to drive the workpieces or transport pallets 11 at a different speed compared to the transport chain. In this case, the central groove 34 in the running surface 35 of the guideway 14 can be dispensed with.

Alternatively, it would also be possible to provide the chain parts 15 only with accumulating rollers 31, and not with rollers 29. In this case, the transport chain 13 either slides along on the running surface 35 of the guideway 14 or it rolls off with the accumulating rollers 31 on the running surface 35. In the latter case, the workpieces or transport pallets 11 are always driven at twice the speed of the transport chain 13—providing the contact of the accumulating rollers 31 and the guideway 14 is not interrupted.

Figure 7:
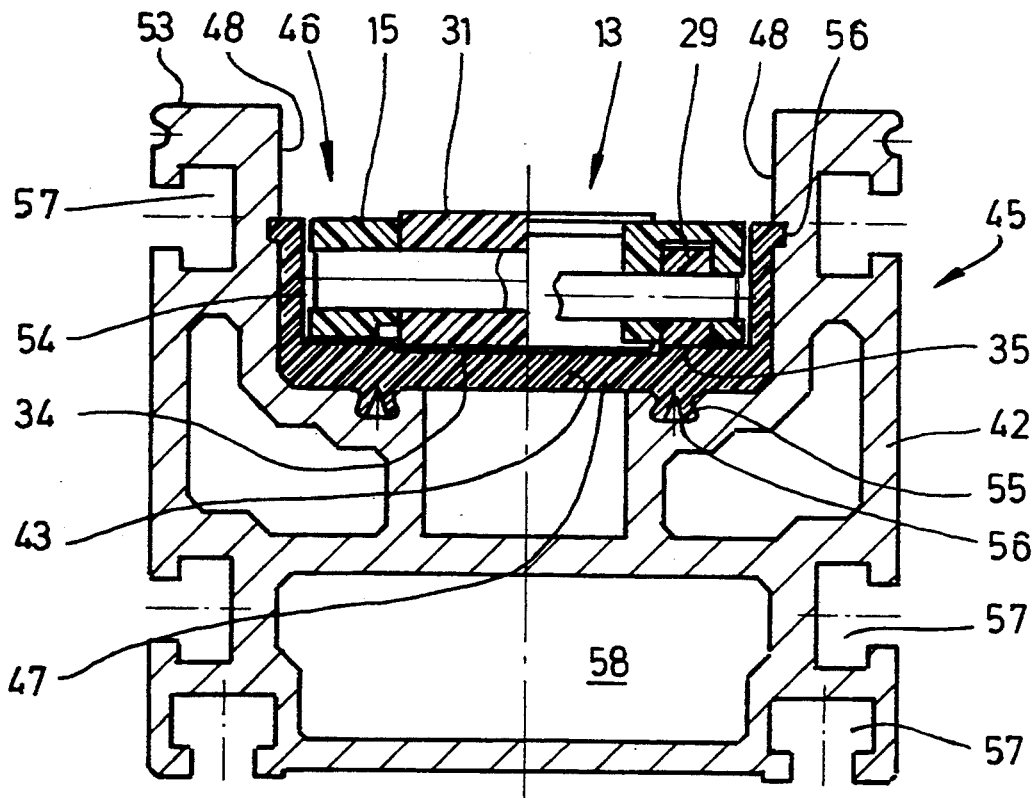
Figure 8:
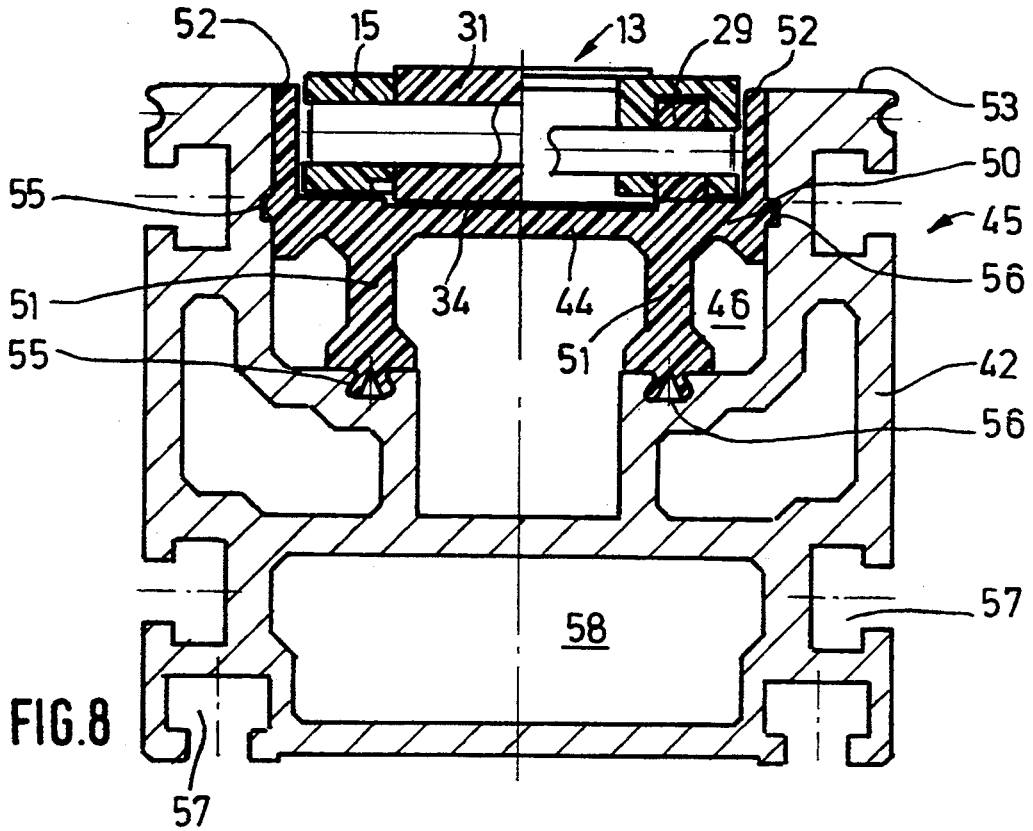

The guideway 14 of the embodiment of the apparatus which is illustrated in FIGS. 1 to 6 is formed in a single piece. According to a further invention, the guideway 45 is formed from several pieces (FIGS. 7 and 8). It is comprised of a support profile 42 which is preferably extruded from aluminium and of a guide rail 43 or 44 made of a plastic material or the like. The guide rails 43 and 44 are disposed in the support profile 42 inside an upper open groove 46.

According to the invention, the guide rails 43 and 44 are designed differently. In particular, they have different heights so that they fill out the groove 46 in the support profile 42 either partially (FIG. 7) or completely (FIG. 8). The guide rails 43 and 44 have an equally designed U-shaped receiving portion 47 for the transport chain 13. The receiving portion 47 of each guide rail 43 and 44 is designed to correspond approximately to the cross section of the transport chain 13. As a result of the differing heights of the guide rails 43 and 44, the transport chain 13 is mounted at different levels in the guideway 45.

The guide rail 43 (FIG. 7) consists only of the U-shaped receiving portion 47. In the bottom of the receiving portion 47 of the guide rail 43, there are the running surface 35 for the rollers 29 and the groove 34 for forming the clearance for the accumulating rollers 31 which are designed different to those of the exemplary embodiment of FIG. 4. The guide rail 43 lines an approximately lower half of the groove 46 in the support profile 42. Accordingly, parallel extending (upright) wall sections 48 are left above the guide rail 43 for a lateral delimitation of the groove 46. These wall sections serve for receiving a preferably cylindrical projection 49 underneath the transport pallet 11 shown in FIG. 5, which may be provided with roll bodies (not shown), if required, in order to reduce the friction between the projection 49 and the stationary wall sections 48 of the groove 46.

Underneath the U-shaped receiving portion 50, which corresponds essentially to the receiving portion 47 of the guide rail 43, the guide rail 44 (FIG. 8) has spacers. In this case, these spacers take the form of two upright webs 51 which extend parallel to one another. The height of the webs 51 is dimension ed such that the upper edges 52 of the receiving portion 50 are flush with a top side 53 of the support profile 42. As a result of this design of the guide rail 44, an upper portion of the transport chain 13 which is guided in a receiving portion 54 of the guide rail 44 is located above a plane which is formed from the top side 53 of the support profile 42 (FIG. 8). In this way, it is possible to transport workpieces with this apparatus which are wider than the transport chain 13 or the guideway 45.

The guide rails 43 and 44 are disposed releasably in the support profile 42. For this purpose, the guide rails 43 and 44 have projections 55 which engage corresponding depressions 56 of the groove 46 of the support profile 42 in a positive manner. This engagement can be made by sliding or snapping the guide rail 43 or 44 into the groove 46 of the support profile 42.

At the side walls and the underside, the illustrated support profile has grooves, in particular two T-grooves 57 in each case. These grooves serve for fixing the support profile 42 to support means or the like or for attaching objects of some kind, for example magnets 40 (FIG. 6).

Cavities are also disposed in the support profile 42. A lower cavity 58 serves for returning the empty lower strand of the transport chain 13. To simplify matters, the lower strand is illustrated only in FIG. 9 which is described in detail in the following.

A further embodiment of the apparatus is illustrated in FIG. 9. This apparatus has two parallel guideways. A first guideway 59 (on the right hand side in FIG. 9) is designed like the guideway 45 illustrated in FIG. 7 and is comprised of the support profile 42 and the guide rail 43. However, it would also be possible to design the guideway 59 like in the embodiment of FIG. 5 (without guide rail 43). A transport chain which corresponds to the transport chain 13 (FIGS. 1 to 4) runs in the guideway 59. An empty lower strand 60 of the transport chain 13 is returned in the (lower) cavity 58 of the support profile 42.

The second guideway 61 (shown o n the left hand side in FIG. 9) consists of a special narrow support profile 62 in which no transport chain runs. A top side 63 of the support profile 62 is provided with a plane running surface 64. The support profile 62 has laterally open free spaces 65 which serve for accommodating supply lines 66 or the like and can be closed by cover strips 67. The cover strips 67 can be connected releasably to the open side of the respective free space 65.

The illustrated apparatus has a transport pallet 12 with a special design. This pallet is provided with a relatively wide rest 68 which extends over both guideways 59 and 61. The side of the rest 68 which is directed towards the guideway 59 is provided with two lower projections 69 which protrude into the groove 46 of the support profile 42 from above and bear on the trans port chain 13, namely the accumulating rollers 31 of the transport chain. In this way, the transport pallet 12 is driven on one side. Alternatively, a single projection 69 would also be sufficient to guide the transport pallet 12 in the guideway 59 reliably.

The cylindrical rest 68 [sic] is designed to be rotatable about a vertical axis 76. It has a base piece 77 which is bolted to the transport pallet from be low and a roller 78 which is mounted on the base piece. The base piece 77 is bolted to the transport pallet 12 in such a manner that it can be rotated freely underneath the transport pallet 12 about the vertical axis 76. The roller 78 on the base piece 77 is also freely rotatable about the vertical axis 76. The diameter of the roller 78 is such that its shell is greater than the cylindrical bottom part 79 of the base piece 77 but still has enough play between the parallel wall sections in the groove 46 of the guideway 59 (FIG. 9). The projection 69 of the transport pallet 12 can thus run along in the groove 46 while it is guided by the roller 78.

The edge of the transport pallet 12 which is assigned to the second guideway 61 is provided with at least one running roller 70. This running roller is mounted to freely rotate in an appropriate recess 72 of the rest 68 by means of an axis 71 which extends transversely to the conveying direction 20. The end of the transport pallet 12 which is located opposite the driving end bears on the guideway 61 with the running roller 70 (or the running rollers 70) such that the running roller 70 runs along the running surface 64 as a result of the drive of the transport pallet 12 by the transport chain 13. In the illustrated exemplary embodiment, the running roller 70 is mounted on the transport pallet 12 to rotate about a vertical axis 80. As a result, the running roller 70 has the function of a running roller [sic].

Because of the free space formed between the guideways 59 and 61, the transport pallet 12 is accessible from below so that the workpiece which is disposed thereon can be reached from below as well, especially for assembly purposes.

Alternatively, the second guideway 61 can be provided with a guide rail in which the running rollers 70 can be guided laterally. It would also be possible to drive the transport pallet 12 on both sides. In this case, both guideways are designed the same, in particular like the guideway 59, each having one transport chain 13. The second guideway could also be designed according to the exemplary embodiment of FIG. 8, with a transport chain 13 which projects from the top of the support profile 42 and on which the edge (left edge in FIG. 9) of the transport pallet 12 rests freely. Expediently, no running rollers 70 would be provided in this case.

It is claimed:

1. Apparatus for transporting articles, comprising a transport chain which is driven in a conveying direction and guided along a guideway, said transport chain being comprised of a plurality of interconnected chain parts with adjacent chain parts being connected to one another at articulated connection joints, said chain parts having an underside adapted to face towards the guideway and a topside disposed opposite said underside, at least some of said chain parts being provided with at least one roll body for allowing respective chain parts to roll along the guideway, said at least one roll body of each chain part being mounted on the chain part such that the roll body projects from the underside of the respective chain part and is surrounded by the topside of the respective chain part, said transport chain including accumulating rollers for supporting articles to be transported, said accumulating rollers being positioned between adjacent connection joints.

2. Apparatus for transporting articles, comprising a transport chain which is driven in a conveying direction and guided along a guideway, said transport chain being comprised of a plurality of interconnected chain parts, said chain parts having an underside adapted to face towards the guideway and a topside disposed opposite said underside, at least some of said chain parts being provided with at least one roll body for allowing respective chain parts to roll along the guideway, each of said roll bodies being freely rotatably mounted on an axle disposed in a respective chain part, said at least one roll body of each chain part being mounted on the chain part such that the roll body projects from the underside of the respective chain part, said transport chain including accumulating rollers for supporting articles to be transported, each of said accumulating rollers being freely rotatably mounted on an axle disposed in a respective chain part, the axle upon which said roll body is mounted having an axis that is offset towards the underside of the respective chain part relative to an axis of the axle upon which the accumulating roller is mounted.

3. Apparatus for transporting articles, comprising a transport chain which is driven in a conveying direction and guided along a guideway, said transport chain being comprised of a plurality of interconnected chain parts, said chain parts having an underside adapted to face towards the guideway and a topside disposed opposite said underside, at least some of said chain parts being provided with at least one roll body for allowing respective chain parts to roll along the guideway, said at least one roll body of each chain part being mounted on the chain part such that the roll body projects from the underside of the respective chain part, said transport chain including accumulating rollers for supporting articles to be transported, the guideway including a running rail for being moved towards and away from the transport chain to frictionally engage the accumulating rollers and thereby cause the accumulating rollers to rotate.

* * * * *